UNITED STATES PATENT OFFICE.

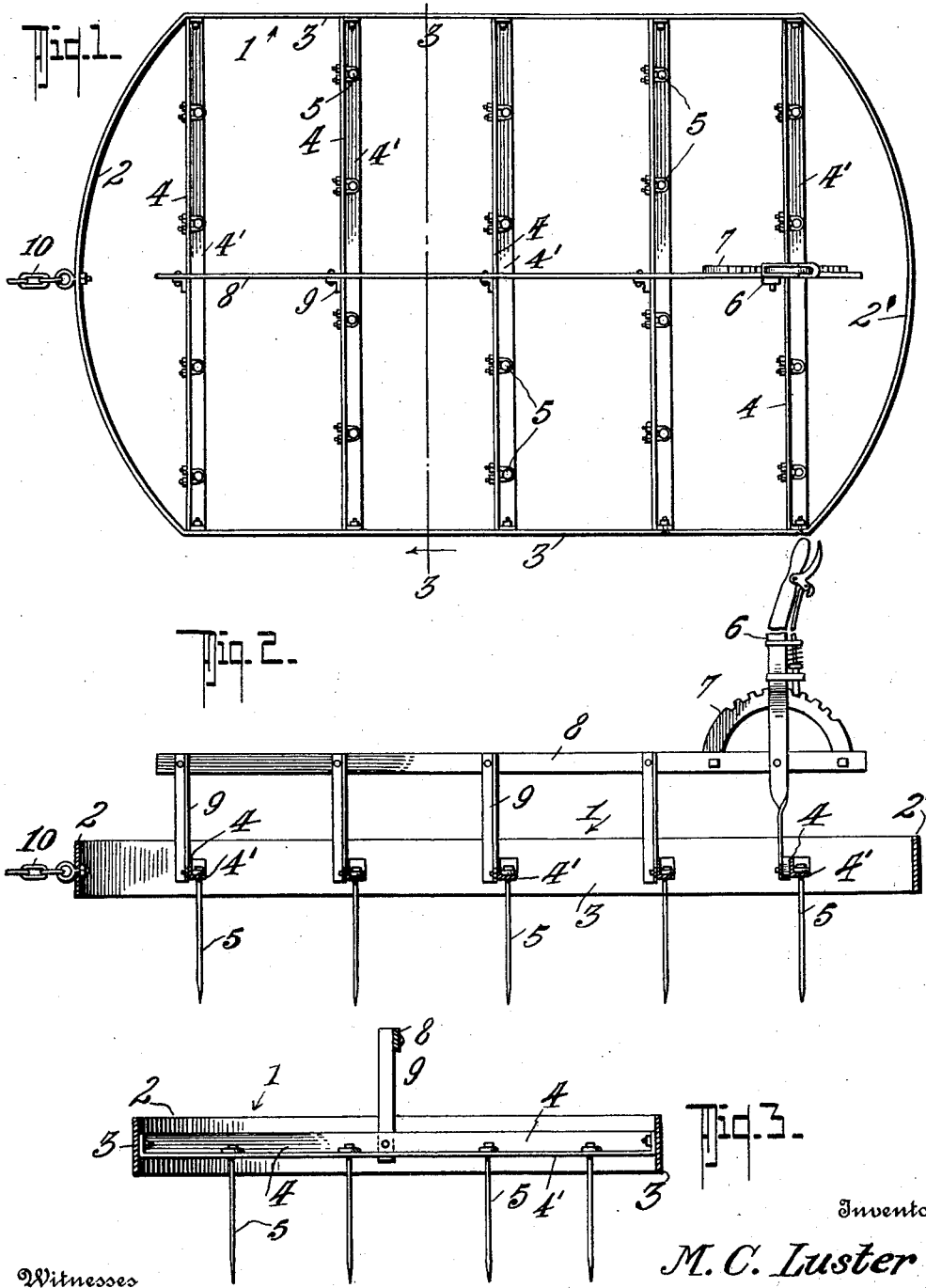

MACK C. LUSTER, OF OKMULGEE, OKLAHOMA.

HARROW.

1,109,436.  Specification of Letters Patent.  Patented Sept. 1, 1914.

Application filed July 15, 1913. Serial No. 779,192.

*To all whom it may concern:*

Be it known that I, MACK C. LUSTER, a citizen of the United States, residing at Okmulgee, in the county of Okmulgee and State of Oklahoma, have invented a new and useful Harrow, of which the following is a specification.

This invention relates to improvements in harrows especially in harrows adapted for producing a dust mulch.

The object of the invention is to provide a simple and efficient device of this character constructed to pulverize and level the ground between rows of corn, cotton and the like and it is especially useful in dry weather and during a drouth.

With this and other objects in view, the invention consists of certain novel features of construction, and the combination and arrangement of parts as will be more fully described and claimed.

In the accompanying drawings: Figure 1 represents a top plan view of this improved harrow; Fig. 2 is a longitudinal section thereof; Fig. 3 is a transverse section thereof taken on the line 3—3 of Fig. 1.

In the embodiment illustrated, a frame 1 is shown just wide enough to pass between rows of corn or the like spaced the usual distance apart. This frame is preferably constructed in substantially rectangular form and composed of a broad steel band about four inches wide more or less and of any suitable or desired thickness. The ends 2 and 2' in this frame are preferably rounded or bulged outwardly with rounded corners to facilitate the passage of the harrow between the rows without danger of injuring the crop and to permit the earth to readily pass under the frame. A plurality of angle bars 4 are arranged transversely of the frame and pivoted at their ends to the side members 3 of the frame, the ends of said bars being preferably bent at right angles and bolted to the band forming the frame. The heads of the bar pivoting bolts are preferably arranged flush with the outer face of the band to prevent injury to the corn or other crop being cultivated. These bars are spaced any desired distance apart and a plurality of teeth 5 are secured therein preferably by passing them through apertures in the horizontal flanges 4' of the bars and clamping them to the vertical flanges by bolts. The teeth 5 are adjustable to any desired pitch by means of a lever and rack 6 and 7 and a bar 8 which latter is connected to upright fingers 9 fixed to the bars 4 and arranged in alinement. The rack 7 is secured to the bar 8 and the lever 6 is fulcrumed to said bar intermediately of the ends of said lever and fixed at one end to one of the bars 4.

A suitable draft device may be secured to one end of the frame 1 by a chain 10 or otherwise.

This implement which may be drawn by one horse, is designed for use after a cultivator to pulverize the earth thrown up by the cultivator and produce a dust mulch for the corn or other crop which is desirable for retaining the moisture within the surface.

In the use of this implement the curved front member 2 acts as a leveler for the plowed ground over which the implement is drawn, so that the teeth 5 may effectively engage the earth and bring up the moisture, while the outwardly bowed bar 2' at the rear levels the ground after the teeth and leaves a dust mulch. The side bars 3 perform the double function of bearings for the tooth bars, and as a means for holding the harrow out of the rows of corn or cotton so that the tender plants are not injured by contact with sharp edges.

This harrow may be used to advantage after each cultivation with the plow, and it is designed for use continually after the crop is too large for plowing.

I claim as my invention:

1. An implement comprising a leveling frame composed of parallel longitudinal side bars and outwardly curved end bars uniting the extreme ends thereof and lying in the same horizontal plane therewith, a plurality of earth working tools depending from said frame, and means whereby said tools may be inclined downwardly and forwardly, whereby said leveling frame is forced into contact with the soil as the device is drawn forwardly.

2. An implement comprising a leveling frame composed of parallel longitudinal side bars and outwardly curved end bars uniting the extreme ends thereof and lying in the same horizontal plane therewith, a number of transverse tooth supporting bars pivotally supported within said frame, teeth depending from said bars, and means whereby said bars may be rocked to incline said teeth downwardly and forwardly, whereby said leveling frame is forced into contact with the soil as the device is drawn forwardly.

3. An implement comprising a leveling frame composed of parallel longitudinal side bars and outwardly curved end bars uniting the extreme ends thereof and lying in the same horizontal plane therewith, a number of transverse tooth supporting bars pivoted at their opposite ends to said side bars and lying within said frame, teeth depending from said bars and means whereby said bars may be rocked around their pivots to incline said teeth downwardly and forwardly, whereby said leveling frame is forced into contact with the soil as the device is drawn forwardly.

Okmulgee, Okla., June 28th, 1913.

MACK C. LUSTER.

Witnesses:
   J. W. CHILDERS,
   ALBERT ANDERSON.

Copies of this patent may be obtained for five cents each, by addressing the "Commissioner of Patents, Washington, D. C."